April 8, 1969  C. B. BLAIR  3,436,903
BALE ACCUMULATOR GATE CONSTRUCTION
Filed Feb. 6, 1967  Sheet 1 of 2
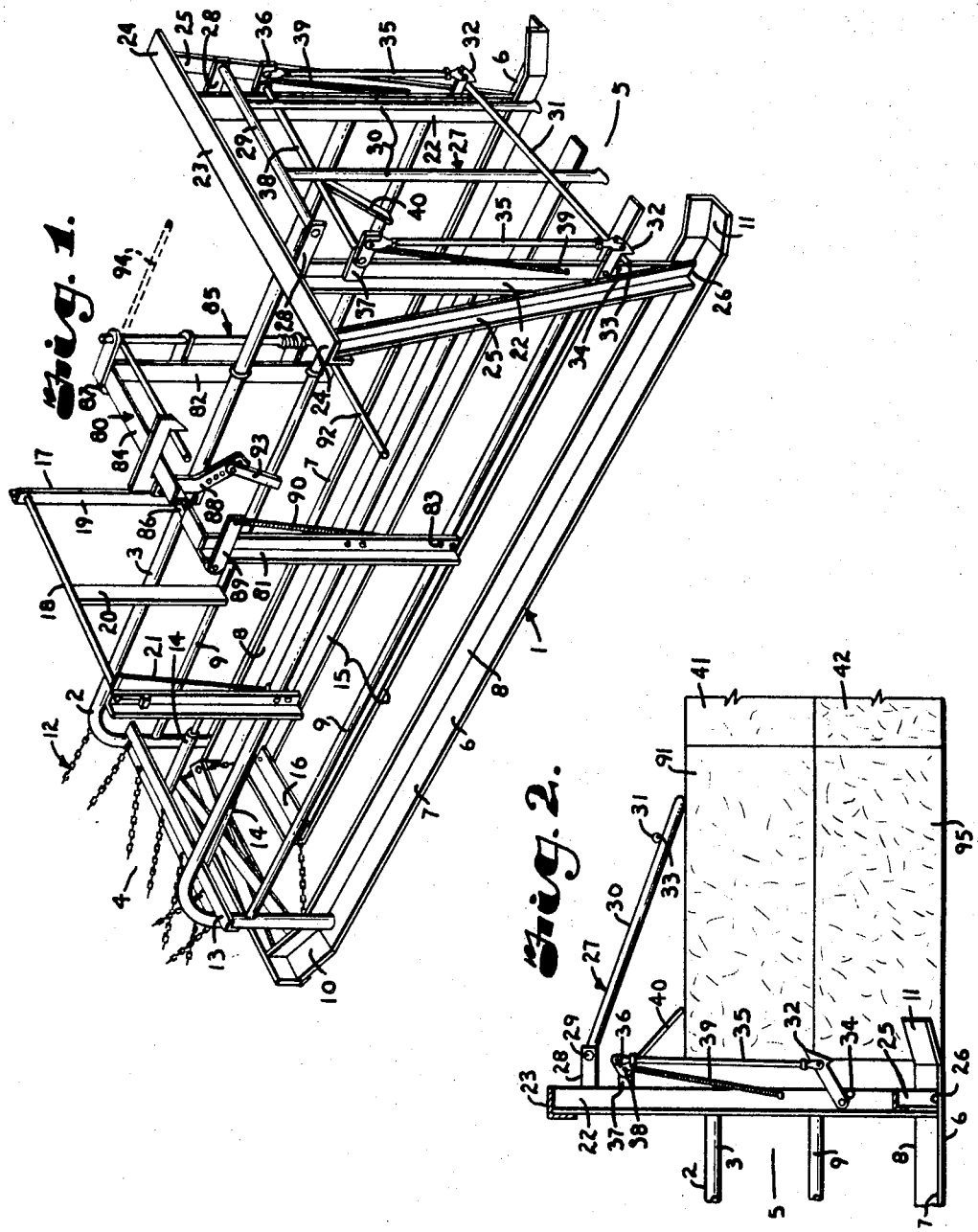
INVENTOR.
CALVIN B. BLAIR
BY
Fishburn and Gold
ATTORNEYS

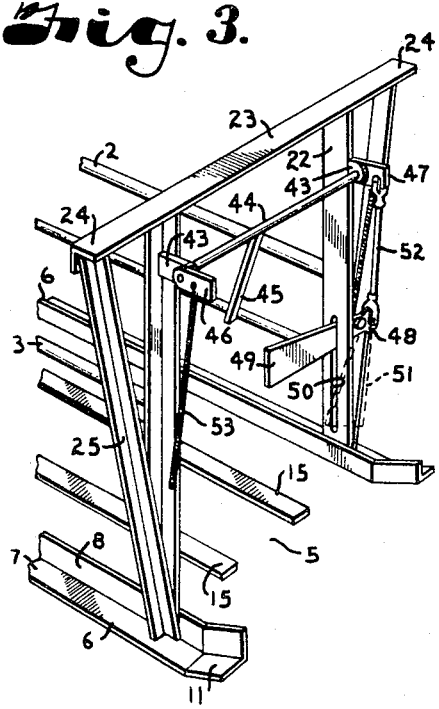
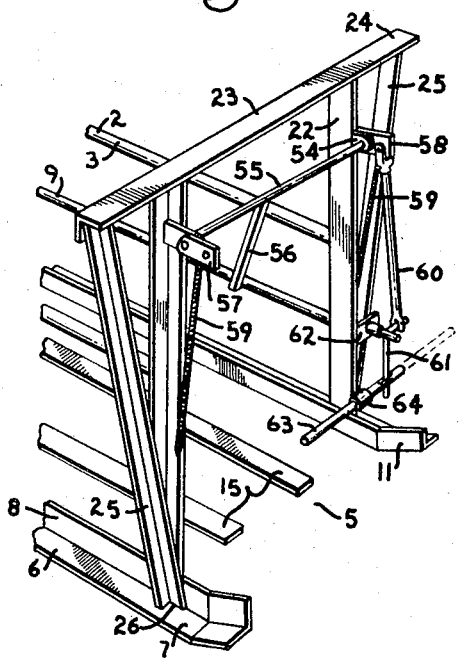

United States Patent Office 3,436,903
Patented Apr. 8, 1969

3,436,903
BALE ACCUMULATOR GATE CONSTRUCTION
Calvin B. Blair, Barnard, Kans., assignor to United Manufacturers, Inc., Barnard, Kans., a corporation of Kansas
Continuation-in-part of application Ser. No. 447,379, Apr. 12, 1965. This application Feb. 6, 1967, Ser. No. 614,369
Int. Cl. A01f *15/00;* B65g *57/16;* B60p *1/00*
U.S. Cl. 56—473.5                                  4 Claims

ABSTRACT OF THE DISCLOSURE

The gate structure on a rear delivery baler drawn bale accumulator and stacker takes several modified forms including a double latch structure operating at the lower bale level, a vertically swinging transverse flag structure, a transversely sliding bolt, a side hinged bar with an overhead latch, and a second gate intermediate the ends of the accumulator producing a two-step accumulation to allow extra time for the rear gate to close following dropping of a fifth bale. The gate supporting rear end of the accumulator frame is rigidly braced by upwardly and outwardly directed structural members.

Cross references to related applications

This invention relates to improvements in a basic bale stacker of the type disclosed by Thor Leif C. Solem et al. in the U.S. Patent No. 2,971,318, issued Feb. 14, 1961. This application constitutes a continuation-in-part of my co-pending application, Ser. No. 447,379, filed Apr. 12, 1965, now Patent No. 3,302,807, entitled, "Baler Drawn Bale Accumulator and Stacker."

Background of the invention

This invention relates to bale handling apparatus of the type adapted to be drawn by a mobile rear delivery baler. The apparatus receives bales thereinto delivered by the baler, accumulates a predetermined number of the bales, and deposits same upon the ground in a stacked group so that a subsequent pick-up device can grasp multiple bales in one operation for efficient transport to a place of storage. Although bale accumulators of the general type disclosed in the above noted patents have proved to be highly desirable under normally encountered conditions of the field, hay and baler, unusual factors require structural modifications for efficient operation.

Summary of the inventon

Special gate structures on the accumulators include rising double latch members which engage a gate cross bar, a vertically pivotal flag which slides across the face of the rear lower bale, a horizontally sliding bolt which is withdrawn transversely of the rear lower bale, a simple overhead latch which actuates a side-hinge supported bar normally engaging the rear lower bale, and an intermediate gate structure positioned between the front end of the accumulator and the rear gate for retarding the relative rearward movement of a fifth bale after tripping of the rear gate. Unique bracing is provided for the frame at the rear gate to maintain desirable rigidity with a minimum weight.

Brief description of the drawings

FIG. 1 is a perspective view of a four-bale, skid supported, accumulator with an improved rear gate structure including bracing members, and also showing an intermediate gate structure.

FIG. 2 is a fragmentary side elevation showing the rear gate structure of FIG. 1 in open condition with a stack of four bales passing rearwardly through.

FIG. 3 is a fragmentary perspective view showing a modified rear gate structure which includes a vertically pivotable bale retaining flag.

FIG. 4 is a fragmentary perspective view showing a further modified rear gate structure including a bale retaining sliding bolt.

FIG. 5 is a fragmentary perspective view showing a still further modified form of rear gate which includes a vertical side hinge and overhead latch cooperating with a bale retaining bar.

Description of the preferred embodiments

The reference numeral 1 (FIG. 1) generally indicates a bale accumulator and stacker embodying this invention. The accumulator 1 comprises a frame 2 having upper elongated structural bars or members 3 extending horizontally and parallel to each other in spaced apart relation between the front 4 and rear 5 of the accumulator. The structural members 3 are spaced apart a distance sufficient to loosely accommodate the width of a hay bale therebetween and extend downwardly at the front 4 terminating at ground level in fixed engagement with spaced apart skids 6. The skids 6 are composed of elongated angles having a horizontal leg 7 in running contact with the ground and a leg 8 rising vertically on the inside of the frame 2. An intermediate bar 9 extends horizontally parallel to and between each skid 6 and the respective structural member 3 forming a fence or side retainer for bales contained within the frame 2. Forward and rear extensions 10 and 11 are secured to the skids 6 and project angularly upwardly therefrom.

A flexible chain hitch 12 is secured to various locations of the frame at the front 4 and to a rear discharge baler (not shown). The hitch 12 also functions to guide bales into the frame 2 over an elongated transverse angle 13 and rearwardly directed guide prongs 14. Spaced apart trailing running straps 15 of semi-rigid flat stock are secured in spaced-apart relation to a support 16 chained to the front 4 of the frame and trail in parallel relation at least partly in contact with the ground as the accumulator is drawn forwardly. The rear ends of the running straps 15 are free and terminate near the rear 5 of the frame in contact with the ground.

A bale guide 17 includes a horizontally transversely directed axle 18 extending across and above the frame 2 near the front 4 and is rotatably mounted on suitable supports 19. A depending bar 20 is fixed to and extends downwardly from the axle 18. Suitable structure including a spring 21 normally maintains the bar 20 in a vertically depending position but permits same to be resiliently urged rearwardly for the purpose of containing an upwardly standing bale so as to urge the bale into ground parallel position within the frame.

Rear upright angles 22 are secured to the rear ends of the structural members 3 and the intermediate bars 9 and are fixed to the skids 6 adjacent the rear thereof. The angles 22 extend upwardly from the horizontal portions of the structural members 3 above the height of two layers of bales in stacked relation. A transverse angle or cross member 23 is fixed to the upper ends of the angles 22 and extends laterally outwardly therefrom forming wings 24. Structural angles 25 are secured at one end thereof to the wings 24 at locations spaced outwardly from the upright angles 22 and extend downwardly and inwardly to positions 26 where the angles 25 meet and are secured to the skids 6. The structural angles 25 add rigidity with minimum weight to the rear 5 of the frame 2 which is entirely open at the rear except for the cross member 23 and structure associate with a rear gate 27.

Mounting ears 28 are fixed to the respective angles 22 at the upper ends thereof and extend rearwardly past the cross member 23. A transversely extending shaft 29 is rotatably mounted at opposite ends thereof on the ears 28 and has a pair of spaced rods 30 fixed at one end thereto and normally depending therefrom. A cross bar 31 is fixed to the rods 30 near the other ends thereof and extends laterally therebeyond, having a length greater than the distance between the rear upright angles 22. A pair of latch members 32 are pivotally mounted for vertical motion on the respective rear upright angles 22 and are adapted to engage and retain the opposite ends 33 of the cross bar 31 to normally prevent the cross bar 31 and, therefore, the rods 30 from moving rearwardly and upwardly about the shaft 29. Suitable stops 34 prevent the latch members 32 from dropping below a relatively horizontal position extending rearwardly of the frame 2.

Draw bars 35 are respectively pivotally engaged at one end thereof with the respective latch members 32 and at the other end thereof to links 36 mounted on ears 37 for vertical pivotal motion. The ears 37 are fixed to the rear upright angles 22 near the mounting ears 28 and a shaft 38 rigidly interconnects the links 36 and rotates therewith. Suitable resilient members such as elongated helical springs 39 urge the links 36 resiliently downwardly thus causing the latch members 32 to normally maintain a horizontally rearwardly directed position even when the accumulator is being drawn over rough terrain. A trigger 40 is fixed to the shaft 38 intermediate the ends thereof and projects downwardly and inwardly into the frame 2 at the level of an upper bale 41 resting on a lower bale 42 (FIG. 2). In operation, a rearwardly moving upper bale contacts the trigger 40 and rotates the shaft 38 which lifts the latch members 32, releasing the gate 27 to pivot upwardly as four bales in end-to-end relation and two stacked on pass therebeneath.

Additional forms of rear gate are shown in FIGS. 3, 4, and 5. In FIG. 3 the upright angles 22 have mounting ears 43 fixed near the upper ends thereof and extending rearwardly therefrom. A horizontal shaft 44 is rotatably mounted on and extends between the ears 43. A trigger member 45 is mounted on the shaft 44 between the ears 43 and normally extends into the frame 2 at substantially the same angle and height as the trigger 40 described above in connection with FIG. 1. The trigger member 45 is adapted to rotate the shaft 44 upon being contacted by a rearwardly moving bale at the level of the upper bale 41 (FIG. 2).

Levers 46 and 47 are rigidly secured to opposite ends of the shaft 44 and normally extend rearwardly therefrom near the respective upright members 22. A mounting member 48 is rigidly secured to an upright angle 22 below the lever 47. A rigid flag member 49 is pivotally mounted on the mounting member 48 for movement in a plane transverse to the frame 2 at the rear 5. The flag member 49 extends through an elongated slot 50 for projection into blocking relationship with a lower bale resting on the running straps 15 at the rear of the frame 2. When pivoted downwardly on the member 48 the flag 49 partially withdraws through the slot 50 into a position indicated by broken lines 51. A link 52 is pivotally connected at opposite ends thereof to lever 47 and to the flag 49 at a position on the opposite side of the mounting member 48 from the portion extending into the frame 2. Suitable elongated helical tension springs 53 are respectively anchored at one end thereof to the levers 46 and 47 and at the other ends thereof to the respective upright angles 22 for resiliently urging the levers downwardly, thus normally maintaining the flag member 49 in bale blocking position within the frame 2. Upon an upper layer bale, such as bale 41 (FIG. 2), moving rearwardly, the trigger member 45 is actuated drawing the flag member 49 downwardly to the position 51 and permitting the accumulated bales to exit from the accumulator as described above. After the bales have passed beneath the trigger member 45 the springs 53 cause the trigger member and flag member 49 to assume their initial positions.

Referring to FIG. 4, ears 54, shaft 55, trigger member 56, levers 57 and 58, springs 59 and link 60 are similar to the corresponding parts described in connection with the embodiment of FIG. 3. The lower end of the link 60, however, is pivotally secured to one arm of an L-shaped crank or member 61 which is pivotally mounted on an ear 62 fixed to one of the upright angles 22. The other arm of the L-shaped member 61 projects downwardly into loose engagement with a bolt 63 slidably engaged in a tubular socket 64 for selective projection across the end of the accumulator frame. Thus, the actuation of the trigger member 56 by a rearwardly moving bale causes the bolt 63 to be withdrawn out of lower bale blocking position, thereby releasing the accumulated group of bales within the frame. After passing rearwardly out of the frame the trigger member 56 is released permitting the springs 59 to return the trigger member 56 and bolt 63 to their initial positions.

Referring to the embodiment of FIG. 5, the rear gate structure comprises a forwardly directed bracket 65 mounted on the cross-member 23 between the upright members 22 and a latch member 66 pivotally mounted in unbalanced position on the bracket 65 for movement in a vertical plane extending longitudinally of the frame 2. The latch member 66 has a depending trigger 67 normally extending into the frame and assuming a position similar to the triggers of the above described embodiments. The trigger 67 is pivotally mounted on a depending tail 68 of the latch member 66 in one of a series of bores 69 useful for selectively positioning the trigger 67 to compensate for variations in bale length and other factors. A bolt 70 engages the trigger 67 preventing same from pivoting about the tail 68 when moved rearwardly of the frame 2, but rather, causing the latch member 66 to pivot counterclockwise about the bracket 65 as viewed in FIG. 5. The trigger 67, however, is free to pivot upwardly clockwise about the tail 68, reducing the tendency for the latch member 66 to bounce upon returning to the illustrated position due to its unbalanced mounting. An upper arm 71 of the latch member 66 contacts the cross-member 23 to limit clockwise motion. The upper arm 71 extends rearwardly over and downwardly with respect to the cross-member 23, forming a forwardly directed locking surface 72 and a rearwardly and downwardly directed sloping surface 73 positioned rearwardly of the cross-member 23.

A vertical shaft 74 is rotatably mounted in suitable hinges 75 fixed along one of the upright angles 22 and has an upper radially directed latch arm 76 and a lower radially directed bale engaging arm 77 rigid therewith. The upper arm 76 is at a level whereby upon rotation of the vertical shaft 74 clockwise, as shown in FIG. 5, it engages the sloping surface 73 causing the upper arm 71 to lift and then to drop down with the locking surface 72 preventing the return or counter-clockwise rotation of the shaft 74. This also locks the arm 77 into lower bale blocking position. A helical spring 78 urges the vertical shaft 74 clockwise toward bale blocking position of the arm 77 and a suitable stop 79 prevents arms 76 and 77 from rotating clockwise beyond this position.

Upon the upper rear bale urging the trigger 67 rearwardly, the arm 76 is released permitting the bales to rotate the arm 77 out of blocking relationship whereupon grouped bales are discharged rearwardly from the accumulator. After the bales pass through the rear of the accumulator, the spring 78 returns the arm 76 into engagement with the latch member 66 for locking the arm 77 in bale blocking position.

Under difficult condition of operation, e.g., when the bales are nonuniform, terrain is excessively rough or the bale discharge from the baler is erratic, an intermediate gate may be desirable. Referring to the embodiment of FIG. 1, an intermediate gate 80 is shown mounted thereon and comprises a pair of uprights 81 and 82 respectively mounted on the structural members 3 and bars 9 by means of U-bolts 83 and extending upwardly intermediate the front and rear ends 4 and 5. The uprights 81 and 82 project to a height generally equal to the height of the cross member 23 and a transverse member 84 is secured to and extends between the upper ends thereof. An intermediate gate structure generally designated 85 is mounted on the uprights 81, 82 and the transverse member 84 and is similar in structure and operation to the gate structure described in connection with FIG. 5 with the following exceptions. A shaft 86 is rotatably mounted in ears 87 fixed near the upper ends of the uprights 81 and 82 and the latch member 88 is fixed thereto for pivotal movement with the rotation thereof. A lever 89 is fixed to one end of the shaft 86 and extends radially therefrom. A spring 90, which is suitably anchored at a position remote from the shaft 86, resiliently urges the lever 89 clockwise, thereby aiding in maintaining the latch member 88 in locked position and reducing the possibility of a shock load on the frame 2 causing the latch member to accidently release.

In operation, the intermediate gate 80 helps insure that five bales will not be released from the accumulator instead of four. The fifth bale (not shown) normally pushes the fourth bale 91 (FIG. 2) against the third bale 41 which actuates the rear gate trigger mechanism for releasing four bales in stacked condition. If the fifth bale drops into the accumulator too soon, it may move rearwardly with the four bales and out the rear of the accumulator before the rear gate has a chance to close. To prevent this the bales are accumulated and gated as follows when the intermediate gate 80 is included in the combination.

The first bale, corresponding to the bale 42, drops into the accumulator and comes to rest against the arm 92 of the intermediate gate 80. The second bale is then forced to slide over the upper surface of the first lower bale thus assuming the position taken by the bale 41 (FIG. 2). This second bale trips the latch member 88 and the first and second bales, in stacked relation, move rearwardly against the rear gate. The upper bale, however, due to the position of the latch member trigger 93 of the intermediate gate is displaced slightly forwardly of the lower bale so that the trigger 40 is not actuated and the first and second bales remain trapped within the accumulator against the rear gate. The first bale also maintains the arm 92 in open position (broken lines 94) during this period. The third bale then drops drops onto the ground assuming the position 95 (FIG. 2) pushing against the first bale. The fourth bale, corresponding to the bale 91, then moves over the third bale 95, beneath the latch member 88 (which rotates upwardly out of the way) and against the second bale 41. The fifth bale (not shown) urges the bale 91 against the bale 41 causing the bale 41 to actuate the trigger 40 at the rear gate permitting the four grouped bales to move rearwardly from the accumulator. When the bales 95 and 91 move past the arm 92, the intermediate gate immediately closes although the rear gate is still open permitting the grouped bales to pass therethrough. Thus, if the fifth bale drops prematurely, it will be retarded by arm 92 even though the rear gate is open at the time of drop and would not close in time to restrain the rearward passage of the fifth bale. The U-bolts 83 permit the forward or rearward adjustment of the gate structure 85 as needed.

It is to be understood that although certain forms of this invention have been illustrated and described it is not to be limited thereto except insofar as such limitations are included in the following claims.

What is claimed and desired to be secured by Letters Patent is:

1. A bale accumulator and stacker comprising:
  (a) an elongated frame having a rear end and upwardly extending sides spaced apart to receive bales therebetween, said rear end including;
  (b) a rear upright member on each of said sides and extending upwardly a distance greater than two bale layers, a horizontal structural cross member secure to and extending between the upper ends of said upright members, a latch member pivotally mounted on said cross member and having a trigger normally extending into the frame at two-bale height, said latch member being adapted to pivot in response to said trigger being pushed rearwardly by a moving bale,
  (c) said latch member having a forwardly directed locking surface and a rearwardly directed latch opening sloping surface,
  (d) a vertical shaft rotatably mounted on one of said upright members and having an upper radially directed latch arm and lower radially directed bale engaging arm secured thereto, said upper arm being engageable with said latch member forwardly and rearwardly directed surfaces upon rotation of said vertical shaft in opposite direction, said lower arm assuming a blocking relation to said rear end when said upper arm is engaged with said latch member forwardly directed surface, said lower arm being adapted to swing out of rear end blocking position upon disengagement of said upper arm from said latch member forwardly directed surface.

2. A bale accumulator and stacker comprising an elongated frame having a rear end and upwardly extending sides spaced apart to receive bales therebetween, said rear end including;
  (a) a rear upright member on each of said sides and extending upwardly a distancse greater than two bale layers, a horizontal shaft rotatably mounted on and extending between said upright members near the upper ends thereof, a trigger member mounted on said shaft between said upright members and normally extending into said frame at two-bale height, said trigger member being positioned to rotate said shaft upon being pushed rearwardly by a rearwardly moving bale;
  (b) a lever fixed to said shaft and extending therefrom, a mounting member secured to said frame below said lever, release means movably retained on said mounting member;
  (c) bale restraining means associated with said release means for movement between positions blocking and opening said rear end, a link between said lever and said release means whereby the rotation of said shaft by said trigger moving rearwardly causes said restraining means to open said rear end;
  (d) said release means comprising an L-shaped member pivotally connected intermediate the ends thereof to said mounting member and having one arm engaging said link and the other arm engaging said bale restraining means; and
  (e) said bale restraining means comprises a socket secured to said frame and a sliding bolt member in said socket.

3. A bale accumulator and stacker comprising an elongated frame having a rear end and upwardly extending sides spaced apart to receive bales therebetween, said rear end including:
  (a) a rear upright member on each of said sides and extending upwardly a distance greater than two bale layers, a horizontal shaft rotatably mounted on and extending upwardly a distance greater than two bale upper ends thereof, a trigger member mounted on said shaft between said upright members and normally extending into said frame at two-bale height, said trigger member being positioned to rotate said shaft upon being pushed rearwardly by a rearwardly moving bale;
  (b) a lever fixed to said shaft and extending therefrom, a mounting member secured to said frame below said lever, release means movably retained on said mounting member;

(c) bale restraining means associated with said release means for movement between positions blocking and opening said rear end, a link between said lever and said release means whereby the rotation of said shaft by said trigger moving rearwardly causes said restraining means to open said rear end;

(d) said release means comprising a flag member pivotally mounted intermediate the ends thereof on said mounting member; and (e) said bale restraining means comprises a projecting portion of said flag member.

4. A bale accumulator and stacker comprising:

(a) an elongated frame adapted to enclose at least four bales therein grouped in horizontally and vertically stacked rows, said frame having a bale receiving front end and a rear end including a bale actuated rear gate for releasing accumulated bales, said frame including ground contacting means for movably supporting said frame on the ground;

(b) intermediate gate structure mounted on said frame intermediate said front and rear ends and normally blocking the rearward travel of bales within said frame, said trigger means associated with said intermediate gate structure and actuated by contact with upper layer bale for releasing said intermediate gate whereupon bales blocked by said intermediate gate are permitted to move rearwardly against said rear gate; and (c) means cooperating between said intermediate gate structure and said frame for adjusting said intermediate gate structure forwardly and rearwardly of said frame.

References Cited

UNITED STATES PATENTS

| | | |
|---|---|---|
| 1,225,031 | 5/1917 | Heiden. |
| 2,649,982 | 8/1953 | Ray. |
| 2,845,770 | 8/1958 | Fessler. _____ 56—473.5 |
| 2,971,318 | 2/1961 | Solem et al. |
| 3,065,866 | 11/1962 | Meyer et al. |
| 3,308,971 | 3/1967 | Sinden et al. _____ 214—353 X |

FOREIGN PATENTS 1,263,664  5/1961  France.

ALBERT J. MAKAY, *Primary Examiner.*

U.S. Cl. X.R.

214—6, 353